United States Patent
Meredith et al.

(10) Patent No.: US 7,005,073 B2
(45) Date of Patent: Feb. 28, 2006

(54) RESIDUAL WASTEWATER CHLORINE CONCENTRATION CONTROL USING A DYNAMIC WEIR

(75) Inventors: Christopher Edward Meredith, Gainesville, FL (US); Oscar Dardo Crisalle, Gainesville, FL (US)

(73) Assignee: The University of Florida Research Foundation, Inc., Gainesville, FL (US)

(*) Notice: Subject to any disclaimer, the term of this patent is extended or adjusted under 35 U.S.C. 154(b) by 113 days.

(21) Appl. No.: 10/777,259

(22) Filed: Feb. 12, 2004

(65) Prior Publication Data

US 2004/0217067 A1  Nov. 4, 2004

Related U.S. Application Data

(60) Provisional application No. 60/467,111, filed on May 1, 2003.

(51) Int. Cl.
*C02F 1/76* (2006.01)

(52) U.S. Cl. .................. 210/739; 210/754; 210/109; 210/137; 210/143; 137/8

(58) Field of Classification Search ............. 210/739, 210/749, 754, 97, 109, 137, 143, 198.1, 205, 210/540; 137/8
See application file for complete search history.

(56) References Cited

U.S. PATENT DOCUMENTS

| | | | | |
|---|---|---|---|---|
| 3,940,337 A | * | 2/1976 | Robison | 210/197 |
| 4,110,215 A | | 8/1978 | Bramlett | |
| 4,117,560 A | * | 10/1978 | Kidon et al. | 4/321 |
| 4,759,907 A | | 7/1988 | Kawolics et al. | |
| 5,015,393 A | * | 5/1991 | Russell et al. | 210/744 |
| 5,378,376 A | * | 1/1995 | Zenner | 210/776 |
| 5,556,538 A | * | 9/1996 | Beard et al. | 210/194 |
| 6,238,577 B1 | | 5/2001 | MacLaren | |
| 2002/0023862 A1 | * | 2/2002 | Linwood et al. | 210/97 |
| 2003/0024866 A1 | * | 2/2003 | Wang | 210/221.2 |

FOREIGN PATENT DOCUMENTS

JP  09-206586 A  *  8/1997

* cited by examiner

*Primary Examiner*—Frank M. Lawrence
(74) *Attorney, Agent, or Firm*—Akerman Senterfitt

(57) ABSTRACT

An automated reactor-based system for treating water includes a reactor having an inlet to provide water at an inlet flow rate into the reactor, structure for adding at least one treatment chemical to the water and structure for dynamically adjusting an output flow rate of the water from the reactor. A controller is communicably connected to the structure for adjusting output flow rate to dynamically control the residence time of the water in the reactor to a predetermined residence time. The controller receives at least one input including the inlet flow rate and generates an output flow rate value to achieve the predetermined residence time. The output flow rate value is communicated to and implemented by the structure for dynamically adjusting output flow rate.

21 Claims, 4 Drawing Sheets

RESIDUAL WASTEWATER CHLORINE CONCENTRATION CONTROL USING A DYNAMIC WEIR

CROSS-REFERENCE TO RELATED APPLICATIONS

This application claims the benefit of U.S. Provisional Application No. 60/467,111 entitled "WASTEWATER TREATMENT CONTROL SYSTEM AND METHOD" filed on May 1, 2003.

STATEMENT REGARDING FEDERALLY SPONSORED RESEARCH OR DEVELOPMENT

Not applicable.

FIELD OF THE INVENTION

The invention relates to systems and methods for controlling retention time of a fluid in open-channel flow system, and more particularly to a wastewater treatment system and method using a dynamic weir.

BACKGROUND

Chlorination is by far the most common method of wastewater disinfection and is used worldwide for the disinfection of pathogens before discharge into receiving streams, rivers or oceans. Chlorine is known to be effective in destroying a variety of bacteria, viruses and protozoa, including *Salmonella, Shigella* and *Vibrio cholera*.

Wastewater chlorination was initially applied in the early 1900 s and was soon implemented in many other cities in the United States based on this early success. Today, wastewater chlorination is widely practiced to reduce microbial contamination and potential disease risks to exposed populations.

There is a water use cycle in which drinking water is treated, then consumed and discharged as wastewater. Following additional treatment, wastewater is discharged and may enter source waters used for drinking and recreation. The treatment-use-discharge process then begins again, continuing the water use cycle.

A typical wastewater chlorination reactor 100 is shown in FIG. 1, where the process of chlorination is carried out in a reactor of rectangular cross section and rectangular profile. Water enters the basin at an inlet flow rate $Q(t)$ in cubic meters per second (m³/s), where the variable t denotes time (in seconds), and is treated with a dose of chlorine injected through a chlorine-rich stream $Q_d(t)$. The injected chlorine mixes with the water in the entrance region of the reactor denoted as dosage basin 15 in FIG. 1, where the water quickly adopts a chlorine concentration $C_0(t)$ that is measured by a concentration transducer (CT) 8 that produces an on-line measurement of chlorine concentration. The water then enters the ensuing section of the reactor, denoted as contact basin 18 in FIG. 1, where the chlorine effects further disinfection. The demarcation between the dosage basin 15 and the contact basin 18, shown by the vertical dash-dot line 12 in FIG. 1, which may be physically defined by the presence of baffles or other agitation, equipment, or be implicitly defined by the location of the concentration transducer 8.

FIG. 1 is not drawn to scale, and contact basin 18 is typically much larger than the dosage basin 15. The contact basin 18 has a length L (m), and the coordinate z is used to characterize specific locations along the horizontal direction, with z=0 (m) denoting the beginning of the contact basin and z=L (m) denoting the location where the water exits the contact basin 18. The width of the basin is denoted by W(m) (not shown in FIG. 1). The outlet of the contact basin 18 includes a weir 11 over which the water flows out of the basin at a flow rate $Q_w(t)$. The weir 11 shown in FIG. 1 is static, which means that its height, denoted by $h_w$ in FIG. 1, is set to a fixed value and is not intended to be further adjusted during normal operation. The height of water in the basins, denoted by h in FIG. 1, is normally not very deep, with typical values ranging from 1 to 3 m, which remain approximately constant at all locations z along the contact basin 18.

The wastewater chlorination process typically makes use of a master controller (MC) 9, along with a ratio controller (RC) 6. Some wastewater treatment plants use an additional slave controller (SC) 7 as shown in FIG. 1 arranged in cascade with MC 9 to further improve performance. The control configuration of FIG. 1 is known as a cascade/ratio control scheme for chlorine dosage adjustment. The MC 9 and SC 7 controllers are most commonly of the proportional-integral-derivative (PID) type. The cascade configuration of controllers, ratio control, and PID control are mature technologies that are well known to those with ordinary skill in the art.

The cascade/ratio control architecture for chlorine dosage adjustment shown in FIG. 1 first uses controller SC 7 to compare the chlorine concentration measurement $C_0(t)$ produced by CT 8 with the set-point $C_o^o(t)$ which represents the target value of chlorine concentration desired at location z=0, and produces a prescribed value of the ratio of the dosage flow rate to the inlet flow rate, namely R(t). Ratio controller 6 makes use of the prescribed value of the ratio R(t) produced by SC 7 along with the value of the inlet flow rate Q(t) measured by the flow transducer FT 4 to produce the prescribed value of the dosage stream $Q_d(t)$. The plant operator generally specifies the set-point. However, the specification is made automatically by the MC 9 when a cascade configuration is implemented. MC 9 produces the required specification after comparing the outlet chlorine concentration $C_L(t)$ measured by the concentration transducer (CT) 10, with the operator-specified the set-point $C_L^o(t)$, which is the desired value of chlorine concentration in the outlet stream. The controllers SC 7, MC 9, and RC 6 feature adjustable parameters, such as gains and integral time-constants, that must be adjusted using standard parameter-tuning techniques that are well known to those with ordinary skill in the art. The cascade system with ratio control is expected to ensure that the treated water satisfies environmental regulations often imposed by the government, such as the chlorine concentration $C_L(t)$ in the outlet flow being greater than 1 ppm, and that the residence $\tau_{res}(t)$ time, $$\tau_{res}(t) = LW \frac{h(t)}{Q(t)} \qquad (1)$$

being greater than 15 min.

A numerical simulation study was used to characterize the performance of the conventional wastewater processing system and associated control scheme shown in FIG. 1. The one-dimensional (z-direction) chlorine concentration profile in the contact basin can be described by the reaction-diffusion equation:

$$\frac{\partial C}{\partial t} = -v(t)\frac{\partial C}{\partial z} + r_C + D\frac{\partial^2 C}{\partial z^2} \quad (2)$$

and by the conservation of mass equation:

$$\frac{dh(t)}{dt} = \frac{1}{LW}Q(t) - \frac{1}{LW}Q_w(t) \quad (3)$$

where C denotes the concentration of chlorine at a location z and at a time instant t, the variable $r_c$ denotes the rate of consumption of chlorine by chemical reaction and by volatilization, D denotes the dispersion coefficient for chlorine in water, and $v(t)=Q(t)/(Wh(t))$ is the linear velocity of the water in the basin. It is assumed that controllers SC and RC are highly effective and therefore they ensure attainment of the boundary condition $C(t, z)=C_o^o(t)$ at z=0.

The solution of the partial differential equation (2) is accomplished via standard numerical methods, including a method that approximates (2) using a finite number of ordinary differential equations, obviating the need for identifying the value of the dispersion coefficient. The rate of chlorine consumption via chemical reaction and volatilization was modeled as $r_c=-kC$, where k=0.000109 s$^{-1}$ based on data from a representative experimental wastewater treatment plant. The outlet flow rate $Q_w(t)$ was modeled using the well-known Francis weir equation. Finally, the controllers SC 7 and MC 9 were of the PID form, tuned by an exhaustive trial-and-error procedure, with the set point to MC 9 fixed at $C_o^o(t)=2$ ppm. The total basin length was 120 m, and the width was W=8 m. More specifically, the length of the contact basin 18 was L=117.6 m, with the length of the dosage basin 15 making up the remainder of the total length. Without loss of generality, throughout the simulation study it is assumed that the weir was deployed with no suppressions, meaning that the width of the basin W is equal to the width of the weir $w_w$.

Typical results from a computer simulation of system 100 performed using the cascade/ratio configuration shown in FIG. 1 is presented in FIG. 2, where FIG. 2(a) shows that the inlet flow rate Q(t) as a sine wave that varies in amplitude from 0.1 m$^3$/s to 0.7 m$^3$/s over a one-day period corresponding to a seven-fold fold change between the maximum and minimum inlet flow rates. Such sinusoidal profiles are representative of the cycle of water usage in a typical community throughout a day. FIG. 2(d) shows that, in spite of the best effort of the cascade/ratio control system, the outlet-water chlorine concentration $C_L(t)$ oscillates between its smallest value of 0.5 ppm where it violates conventional regulations which require a minimum of 1 ppm of chlorine and its largest value of 6.9 ppm where the unnecessarily high concentration represents a costly waste of chlorine. FIG. 2(c) shows the inlet dose-concentration Co(t) while FIG. 2(b) shows residence time $\tau_{res}(t)$ realized by the cascade/ratio control system 100 for chlorine dosage adjustment. As shown in FIG. 2(b), the large fluctuations of the inlet flow rate cause a highly variable residence time. The residence time oscillates between a minimum value of 35 min to a maximum value of 231 min. Hence, when the flow rates are low the water resides in the basin for a relatively long time, and consequently a very large amount of chlorine is lost via chemical reaction and volatilization leading to a violation of regulations requiring minimal outflow concentration levels.

On the other hand, when the inlet flow rate is high the ensuing short residence time does not give the reaction and volatilization processes time to proceed to a significant extent, and consequently the water exits the contact basin with undesirably high chlorine concentrations. Therefore, the outlet chlorine concentration set point cannot simply be increased to avoid violation, as the accompanying overchlorination problem would be exacerbated.

This simulation results shown in FIGS. 2(a)–(d) illustrate the limitations of a system 100 which utilizes a conventional cascade/ratio control configuration. A major problem with such a system is that the large fluctuations in input flow rate cause undesirable fluctuations in residence time, and a concomitant degradation of concentration-control performance which results because none of the controllers in the cascade/ratio configurations of FIG. 1 are designed to keep the residence time from experiencing such strong variations.

SUMMARY

An automated reactor-based system for treating water includes a reactor having an inlet to provide water at an inlet flow rate into the reactor, structure for adding at least one treatment chemical to the water, and structure for dynamically adjusting an output flow rate of the water from the reactor. A residence-time controller (RTC) is communicably connected to the structure for adjusting output flow rate to dynamically control the residence time of the water in the reactor to a predetermined residence time. The controller receives at least one input including the measured inlet flow rate and generates an output flow rate value to achieve a user-specified residence time. The output flow rate value is communicated to and implemented by the structure for dynamically adjusting output flow rate. Thus, the residence time of the water in the reactor is manipulated as a function of inlet flow rate to ensure that the fluid is retained in the reactor for a substantially constant residence time, independent of the inlet flow rate.

As used herein the phrase "substantially constant residence time" refers to a case where the plant operator introduces a change in the set point of the RTC controller and the RTC controller provides a residence time which remains within ±5% of the set point under typical inlet-flow conditions, and within ±10% of the set point under very low or very high flow conditions, after all the physically unavoidable transients die out. By holding the residence time in the reactor substantially constant, chemical (e.g. chlorine) concentration control in the water is improved dramatically over conventional approaches.

The structure for dynamically adjusting an output flow rate can comprise a flow obstacle, such as a weir or a sluice gate. In the case of a weir, the weir can provide a dynamically adjustable height or a dynamically adjustable gap, such as a vertical gap. Alternatively, the structure for dynamically adjusting an output flow rate can comprise a pump which provides a variable pumping rate.

The RTC controller can be embodied as a model-based feedforward controller, a PID, PI, or P controller. A PID controller can be deployed in either proportional-only mode, proportional-integral mode, or proportional-integral-derivative mode. The RTC controller can also be a lead-lag controller, a predictive controller, or an adaptive controller. The RTC controller can be implemented as a digital or an analog controller.

The system can provide a substantially constant residence time of the water in the reactor. In a preferred embodiment, the system is a wastewater treatment system.

An automated method for treating water in an open-flow channel includes the steps of measuring an inlet flow rate of water into an open-flow channel, adding at least one treatment chemical to the water, and automatically and dynamically adjusting an output flow rate from the open-fluid channel based on at least one measured variable including the inlet flow rate to achieve a predetermined residence time of the water in the open-flow channel. The method can provide a substantially constant residence time of the water in the flow-channel. The open-flow channel can be part of a wastewater treatment system, where the chemical added comprises a form of chlorine, such as calcium hypochlorite, sodium hypochlorite, chlorine gas, chlorine salts, chlorine dioxide, or other oxidants or disinfectants.

The automatic and dynamic adjustment of the output flow rate can include dynamically adjusting a height of a flow obstacle, such as a weir, or a gap provided by a flow obstacle, or adjusting the pumping rate of a pump.

BRIEF DESCRIPTION OF THE DRAWINGS

A fuller understanding of the present invention and the features and benefits thereof will be accomplished upon review of the following detailed description together with the accompanying drawings, in which.

DETAILED DESCRIPTION OF THE INVENTION

An automated reactor-based system for treating water includes a reactor having an inlet to provide water at an inlet flow rate into the reactor, structure for adding at least one treatment chemical to the water, and structure for dynamically adjusting an output flow rate of the water from the reactor. A controller is communicably connected to the structure for adjusting output flow rate to dynamically control the residence time of the water in the reactor to a predetermined residence time. The controller receives at least one input including the measured or estimated inlet flow rate and generates an output flow rate value to achieve the predetermined residence time which is implemented by the structure for dynamically adjusting output flow rate.

The structure for dynamically adjusting output flow rate can comprise a flow obstacle, such as a weir or a sluice gate. For example, a weir having a dynamically adjustable height or gap (e.g. vertical gap) can be disposed on a side of the reactor opposite to the inlet for controlling the residence time of the water within the reactor and releasing treated water from the reactor. Although the flow obstacle can include a weir or a sluice gate, the invention will generally be described as having a weir when the system includes a flow obstacle. As an alternative to, or in addition to a flow obstacle, a pump can be used to dynamically adjust the output flow rate of water from the reactor. A controller is coupled to the dynamically adjustable flow obstacle or pump, wherein the controller determines a height or gap of the weir, or pumping rate in the case of a pump, based on the inlet flow rate.

Figure 1:
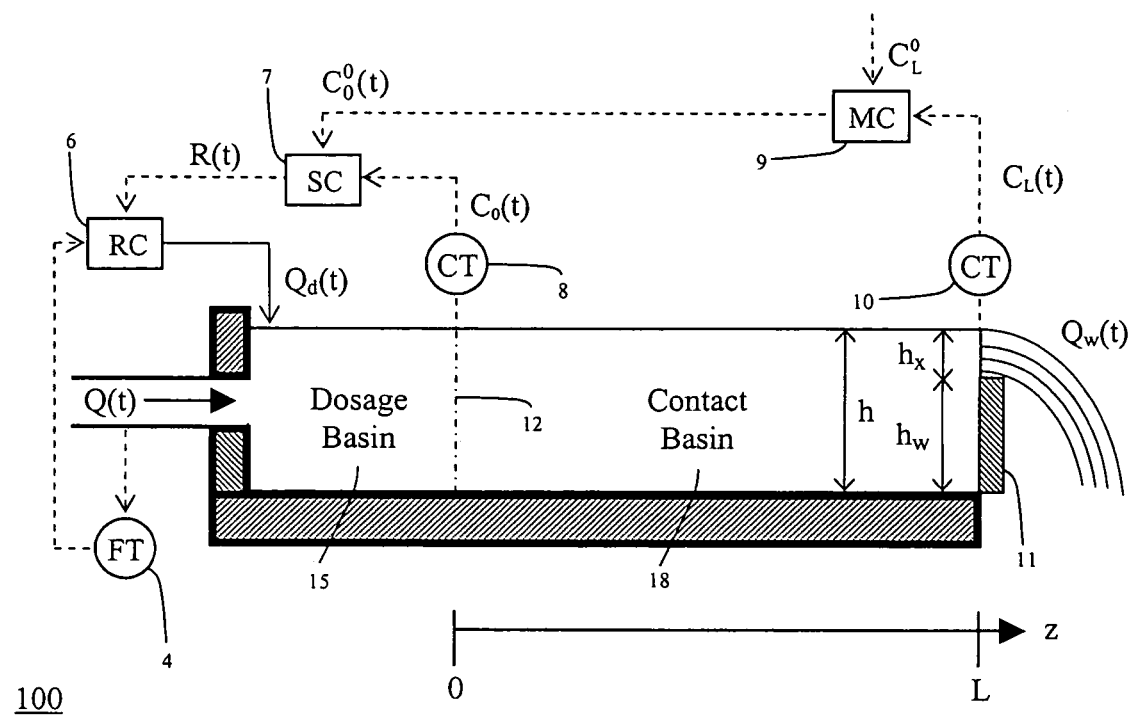
FIG. 1 is an illustration of a prior art wastewater treatment chlorination basin based system utilizing a cascade/ratio control scheme.
Figure 3:
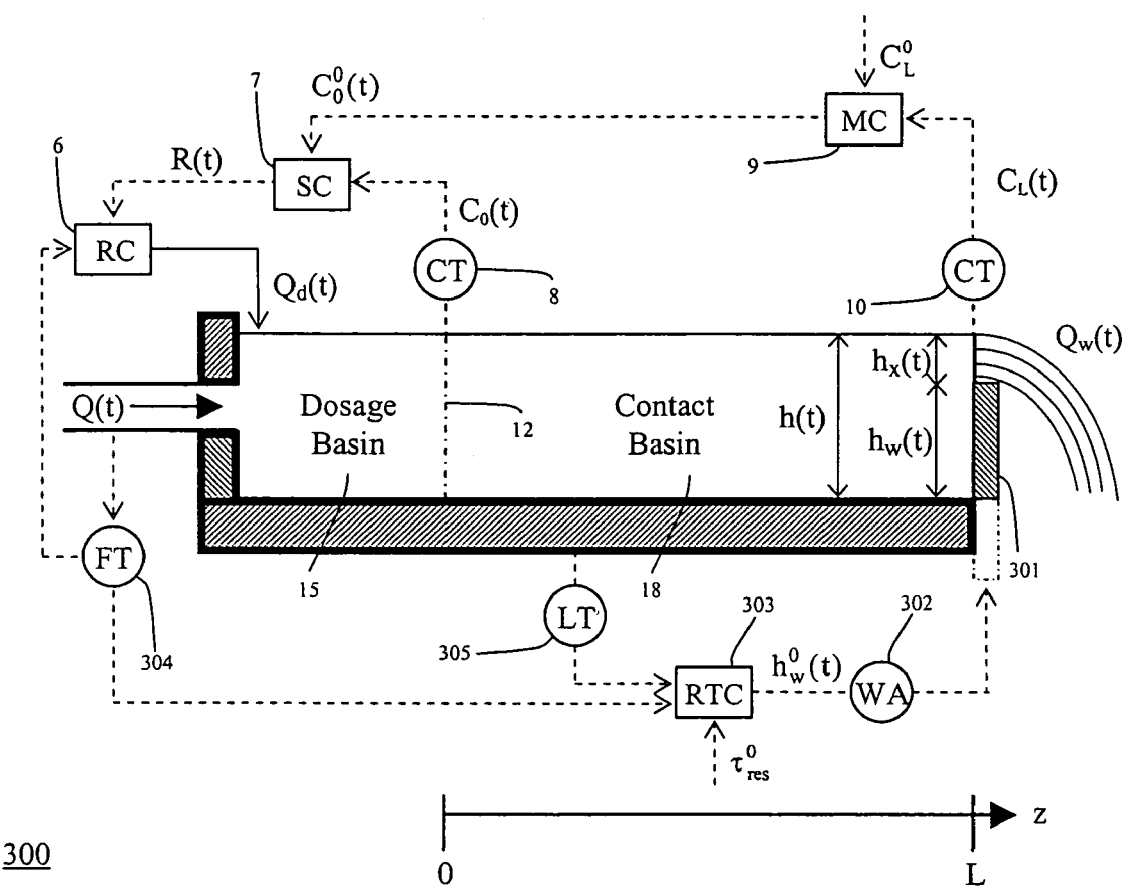
FIG. 3 is an illustration of a wastewater treatment chlorination basin based system including a cascade/ratio control scheme together with a residence time controller connected to a dynamic weir, according to an embodiment of the invention.

A system 300 according to one embodiment of the invention is shown in FIG. 3 and includes a residence-time controller (RTC) 303, a flow transducer (FT) 304, optional level transmitter LT 305, weir actuator (WA) 302, and a dynamic weir 301 located at the distal end of the system 300. In system 300, dynamic weir 301 is generally an electro-mechanical or pneumatic-mechanical device comprising a weir that can be moved up and down by weir actuator (WA) 302 to dynamically adjust the weir height during process operation. Hence, the weir-height variable $h_w(t)$ for system 300 becomes a function of time as it changed dynamically by WA 302. Other components of system 300 shown in FIG. 3 are analogous to those shown and described relating to system 100 shown in FIG. 1 and accordingly have the same reference numbers as shown in FIG. 1.

System 300 includes novel RTC 303, which substantially improves the control of chlorine (or other chemical) dosage particularly when the inlet flow rate is highly variable. RTC 303 can be used with cascade/ratio control system, such as shown in system 100 in FIG. 1. The interconnections and structure of the control scheme for chlorine dosage adjustment may also remain unaltered.

One input to the RTC 303 is the measured value of the inlet flow rate Q(t) produced by FT 304, while a second input that may be optionally used by RTC 303 as shown in FIG. 3 is the water-level height h(t) which is provided by level transmitter (LT) 305. The output of RTC 303 is connected to WA 302 which commands the dynamic weir 301. RTC 303 generally receives a set point $\tau_{res}^o(t)$ from the plant operator which is the target value of the residence time for the wastewater in the contact basin. RTC 303 then uses the measurement signal provided by the FT 304 and optionally the measurement signal provided by the LT 305 to produce an output signal $h_w^o(t)$ that is interpreted by WA 302 as the prescribed weir height. WA 302 then moves the weir 301 up and down, following the signal $h_w^o(t)$ provided by the output signal from the RTC 303, hence changing the extent to which the weir 301 obstructs the outlet flow of water. The effect of the manipulation introduced by RTC 303 is a change in the extent of obstruction to flow that the weir 301 presents to the flowing water, hence changing the outlet flow rate and the water-level height in the contact basin. Therefore, system 300 dynamically changes the residence time in the basin to achieve the set point specified by the plant operator.

Although described above in terms of a dynamic weir 301, as noted above, the output flow rate of the system 300 can be dynamically adjusted using an alternate flow obstacle such as a sluice gate, or without a flow obstacle using a pump.

RTC 303 can be selected from a wide variety of controllers which prescribe an appropriate output signal, including a model-based feedforward controller, a PID, PI or P controller, a lead-lag controller, a predictive controller, or a Smith Predictor. In the case of a PI or P controller, a single PID controller can be used to provide PID, PI, or P control. Proportional control can be realized using a PID controller by turning off the I and the D modes, or as a Proportional- Integral controller by turning off the D mode. When Proportional-Integral-Derivative control is desired, the PID controller can be run keeping active all three modes. The controller can be an analog or a digital controller. In all cases, the RTC controller is designed with the objective of eliminating the discrepancy between the residence time set-point and the actual residence time realized by the flowing water.

One embodiment of the invention is a control method for the RTC 303 which involves use of the digital PI control law in position form:

$$h_w^o(t) = h_w^{bias} + K_c \left[ e(t) + \frac{T}{\tau_1} \sum_{k=0}^{t/T} e(t-kT) \right] \quad (4)$$

This equation is well known to those with ordinary skill in the art, where Kc is the proportional constant of the controller, $\tau_1$ is the integral time constant of the controller, and $h_w^{bias}$ is a constant reference-position for the weir. Each of these three constants is an adjustable tuning parameter. The variable T is the sampling period. The feedback error e(t) can be calculated as follows:

$$e(t) = \tau_{res}^o(t) - LW \frac{h(t)}{Q(t)} \quad (5)$$

where e(t) is interpreted as the difference between the set-point $\tau_{res}^o$ and the estimated residence time $\tau_{res}$ given by equation (1), and where h(t) and Q(t) are measurements provided by the on-line sensors FT 304 and LT 305. The RTC control method based on equations (4) and (5) therefore requires that the controller receive two input signals, namely, h(t) and Q(t). The practical implementation the RTC controller based on the PI control method (4)–(5) may adopt all the safeguards that are known to those with ordinary skill in the art to play a role in the performance of PI controllers, including, but not limited to, the addition of anti-reset-windup features, the use of filtered values of the measurements h(t) and Q(t) to improve the signal-to-noise ratio of the measured signals, the use of self-tuning techniques for identifying appropriate values of tuning parameters, and the introduction of a control override method to handle the limiting cases where the weir height reaches its maximum or its minimum allowed values. Other variations of the control law (4) utilize the velocity form of a discrete PI controller, as well as the addition of a third term to include a derivative mode and transform the law into a PID controller. Analog versions of the control law (4) well known to those with ordinary skill in the art may also be used as the preferred method for deploying RTC 303 in PI or PID mode. In all cases discussed in this paragraph, the feedback error used by the RTC controller 303 is defined as specified in equation (5), including those variations where the measured signals h(t) and Q(t) (or their ratio) are (is) filtered to reduce the corrupting effect of measurement noise.

A second embodiment of the RTC 303 is the model-based feedforward method given by the control following law:

$$h_w^o(t) = \frac{1}{LW} \tau_{res}^o(t) Q(t) - f(Q(t)) \quad (6)$$

where $h_w^o(t)$ is the output signal of the RTC 303, $\tau_{res}^o(t)$ is the set-point for the residence time in the contact basin specified by the plant operator, and Q(t) is the measured inlet flow rate produced by the FT 304, and where:

$$f(Q(t)) = h_x(t) \quad (7)$$

Equation (7) defines a relationship between the weir head $h_x(t)$ (interpreted as the height of water flowing over the weir as shown in FIG. 3 and the inlet flow rate Q(t). A relationship of the form (7) can be obtained experimentally, or through the inversion of a weir-flow correlation as described in paragraph [0037]. The model-based feedforward control method (6) for the RTC 3 requires only one input, namely Q(t), and the algorithm to implement (6) can be programmed in a straightforward fashion in a digital control computer. The signal Q(t) in equation (6) may be a filtered value of the signal produced by the sensor FT at the discretion of the plant operator if the measurement is deemed to be too noisy. Equation (6) serves as the basis for the operation of the RTC using the model-based feedforward method in a system including an adjustable weir.

A process according to a preferred embodiment or the invention begins by specifying the desired set-point value of the residence time $\tau_{res}^o(t)$. Next, at each sampling instant t a measurement of the process variable Q(t) is collected. These values are substituted into (6), along with predetermined values of plant-specific parameters such as L, W, and the inverse weir-correlation f(Q(t)). The result of the calculation is the manipulated variable $h_w^o(t)$, which is implemented by sending a signal to WA 303 as shown in FIG. 3. With the weir height set to the designated value $h_w^o(t)$ prescribed by the RTC method given in (6), the reactor adopts a total fluid height of h(t), resulting in a substantially constant residence time relative to the set point $\tau_{res}^o(t)$ after physically unavoidable transients die out. When the operator specifies a constant set point $\tau_{res}^o(t)$ then the RTC 303 with the model-based feedforward achieves a substantially constant residence time for the fluid passing through the contact basin 18.

The development of the an inverse weir-correlation f(Q(t)) requires the availability of a correlation (also known as a weir-flow model) that describes the flow rate of water that passes over the weir as a function of the weir head. For example, the modified Francis weir equation for the case of no suppressions is as follows:

$$Q_w = 0.415 \sqrt{2g} w_w h_x(t)^{1.5} \quad (8)$$

Equation (8) can be used to describe the flow rate of water $Q_w(t)$ over a rectangular weir of width $w_w$, where g is the gravitational constant (m/s$^2$) and $h_x(t)$ (m) is the weir head. Then the inverse weir correlation can be found by solving (8) for $h_x(t)$ as a function of Q(t) to obtain $h_x(t) = Q_w(t)^{2/3} / (0.34445 \text{ g})^{1/3}$. Recognizing that the inlet and outlet flow rates equalize in a very short time compared to the residence time of water in the basin, it is assumed $Q(t) = Q_w(t)$, which implies that the inverse weir-correlation can be written as $h_x(t) = Q(t)^{2/3} / (0.34445 \text{ g})^{1/3}$ and it its concluded that $$f(Q(t)) = \frac{1}{(0.34445 \text{ g})^{1/3}} Q(t)^{2/3} \qquad (9)$$

Equation (8) and the resulting explicit equation for the inverse correlation (9) is used here to illustrate details of the invention. Other flow correlations may be more appropriate for the specific weir design adopted in the wastewater treatment plant, including different values of the equation-coefficients and values for the exponents. The appropriate correlation can be obtained by the weir manufacturer, or through routine experimentation conducted at the wastewater treatment plant. To implement the model-based feedforward RTC described by (6), the appropriate correlation for the installed weir must be inverted to obtain the corresponding inverse correlation f(Q(t)). In certain cases it is not possible to invert the weir correlation to obtain an explicit equation. One alternative for developing suitable f(Q(t)) values for deployment in the model-based feedforward RTC consists of using the available correlation to generate a two-column table of paired values, where the left column contains a series of head values $h_x$ and the right column contains the corresponding paired value of flow rate over the weir $Q_w$. The inverse map can then be numerically implemented using a table look-up method that consists of first setting $Q_w = Q(t)$, where $Q(t)$ is the current flow measurement, second, searching the right column of the table for the specified value of $Q_w$, third, selecting the corresponding paired value of $h_x$ from the left column, and finally, setting $f(Q(t)) = h_x$.

Standard table interpolation techniques may be used to make the table look-up process more accurate. Another alternative for developing a suitable inverse correlation for deployment in the model-based feedforward RTC controller is to use standard regression techniques for model identification. In this approach, first a number of pairs of values of the form $(h_x, Q_w)$ are generated using the available weir-flow correlation, and then the numerical results are fit with an inverse-weir model of user-selected structure featuring free parameters that are identified using linear or nonlinear regression techniques that are well known to those with ordinary skill in the art. For example, a linear least-squares technique can be used to approximate the inverse of the Francis weir equation with no suppressions (equation (8)) with the parabolic-fit equation:

$$f(Q_w(t)) = -0.0762 Q_w(t)^2 + 0.2188 Q_w(t) + 0.0156 \qquad (10)$$

with an error that is less than ±1% in the range of flow rates ranging from $Q_w(t) = 0.1$ m³/s to $Q_w(t) = 0.7$ m³/s. Deployment of the fitted inverse-model (10) into the model-based feedforward RTC (6) is done after setting $f(Q) = f(Q_w)$, as described above.

The derivation of the model-based feedback method (6) for RTC control is carried out as follows. From FIG. 3 it follows that:

$$h_w(t) = h(t) - h_x(t) \qquad (11)$$

Five equations are then used in conjunction with (11) to obtain (6), namely, $h(t) = \tau_{res}(t) Q(t)/LW$, $Q_w(t) = Q(t)$, $h_x(t) = f(Q_w(t))$, $h_w(t) = h_w^o(t)$, and $\tau_{res}(t) = \tau_{res}^o(t)$. The first equation in the series is a rearrangement of (1), the second equation represents the previously-discussed assumption that the outlet flow rate is approximately equal to the inlet flow rate, and the third equation is an appropriate inverse weir-flow correlation. Finally, the fourth and fifth equations represent the fact that setting the weir height to the desired value $h_w^o(t)$ yields the desired residence time $\tau_{res}^o(t)$. Successive substitution of these five equalities into (11) yields a model-based feedback method (6) for RTC control.

A third embodiment of the RTC controller is also a model-based feedforward controller of the form:

$$\tau_m \frac{d h_w^o(t)}{dt} + h_w^o(t) = \frac{1}{LW} \tau_{res}^o(t) Q(t) - K_m f(Q(t)) \qquad (12)$$

where $K_m$ and $\tau_m$ are the operator-specified gain and time constant of the controller, respectively, and all other variables are as given for (6). In addition, the development of the appropriate expression $f(Q(t))$ is the same as described for (7) and as outlined in the discussion of the second embodiment of the RTC controller. The inclusion of the gain $K_m$ allows the operator to fine-tune the system to compensate for the presence of errors in the inverse weir correlation. The time constant $\tau_m$ allows control over the rate at which the weir moves, and can be used to minimize wear on the hardware components and alleviate the typically unavoidable transient fill problem described later. The digital version of the control law (12) implemented in a sample-and-hold control computer and expressed in velocity form is:

$$h_w^o(t) = \qquad (13)$$
$$\frac{1 - \tau_m}{\tau_m} h_w^o(t - T) + \frac{T/\tau_m}{LW} \tau_{res}^o(t - T) Q(t - T) - \frac{T}{\tau_m} K_m f(Q(t - T))$$

This implementation may adopt, but is not limited to, those control performance safeguards listed in detail in the discussion of the first embodiment. In addition, position forms of equation (12) may be used in a digital control computer, or equation (12) may be directly implemented in an analog computer. In each case, the user may adopt variations that use a filtered value of Q(t) rather than the raw measurement to account for the presence of noise.

Finally, numerous standard control strategies can be utilized as preferred embodiments for deploying the RTC. All these techniques share the common goal of manipulating the weir actuator for the purpose of making the residence time of the flowing water in the contact basin track the value of a user-specified set point for the residence time. For example, any feedback adaptive control scheme, such as those described in standard textbooks such as *Adaptive Control*, by Karl J. Åström, Reading, Mass., 1995, can be utilized provided that the feedback error adopted for control design is the difference between the residence time set point and the measured residence time, as indicated by equation (5). As a further example, predictive control methods, including but not limited to those documented in the book entitled *Model Predictive Control in the Process Industry*, by E. F. Camacho and C. Bordons, London, England, 1995, can be used to deploy the RTC controller provided that the criterion for optimal control is the minimization of future feedback errors of the form (5). Finally, any model-based control strategy, such as optimal control including, but not limited to, techniques given in the book *Industrial Control Systems Design*, by Michael J. Grimble, Chichester, West Sussex, UK, 2001, that explicitly or implicitly incorporates an inverse weir model, such as (7), can be used with this invention provided that the design criterion adopted by the method in question includes the minimization of the difference between the residence time set point and a measured or model-estimated value of the residence time of the water flowing through the contact basin.

Given a sudden change in the inlet flow rate the height of liquid in the reactor changes from an initial value $h_i$ to a final value $h_f$. The time that it takes for the liquid level to change from the initial value to the final value is known as a transient. When the inlet flow rate is suddenly decreased, the transients are typically short, with a duration in the range of 5 to 10 minutes in the case of gravity-driven flows (i.e., when the flow restriction is a weir or sluice gate) for typical wastewater treatment plants. The exact value depends heavily on the aspect ratio (i.e., the ratio of length to width) of the reactor, and on the initial and final flow rates involved. In contrast, when the inlet flow rate in suddenly increased, the resulting transients may be longer because there is an unavoidable period of time needed to fill the basin, as the RTC 303 will cause the weir to rise much faster than the level of liquid in the reactor (unless the variable $\tau_m$ is utilized and tuned appropriately as discussed in the third embodiment of the RTC controller). An estimate of such transients is given by:

$$t_{fill} \cong \frac{LW(h_f - h_i)}{Q_f} \qquad (14)$$

where $t_{fill}$ is the fill-time and $Q_f$ is the final value of the inlet flow rate. The maximum fill-time, and therefore the maximum transient duration, is specific to each plant, depending upon the values of the parameters given in (14). As an example, for the system described herein, which is described by L=120 m, W=8 m, $h_f$=2.62 m, $h_i$=0.37 m, and $Q_f$=0.7 m³/s, it follows that $t_{fill}$=51 minutes. Although possible from a theoretical viewpoint, this situation however is also highly unlikely because in the flow profiles realized in wastewater treatment plants do not show large and sudden changes. The inlet flow changes in a rather smooth and gradual fashion, typically following a sinusoidal type of evolution, effectively preventing the fill time from becoming a significant transient issue.

Figure 4:
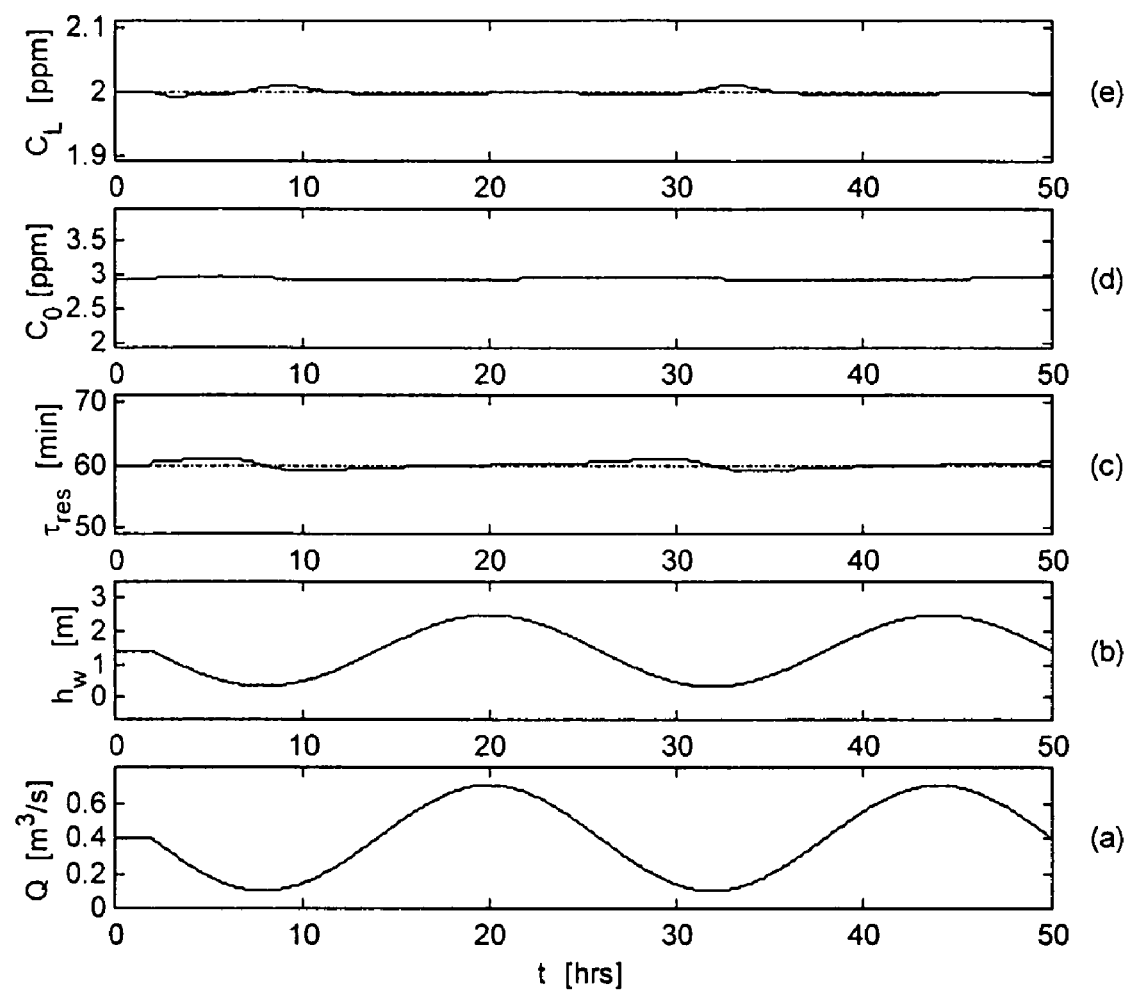
FIG. 4(a)–(e) shows the performance of the system shown in FIG. 3 when the inlet flow rate is highly variable, demonstrating that significantly improved control performance is realized by holding the residence time essentially constant using the residence-time controller according to an embodiment of the invention.

FIG. 4(a)–(e) shows the results of a numerical simulation study describing the closed-loop response of system 300 shown in FIG. 3 including a dynamic weir manipulated by a RTC 3 embodied as a feedforward controller based on equation (6) subject to conditions of a highly variable inlet flow rate. FIGS. 4(e) and 4(d) respectively show the chlorine concentration at the end and the beginning of the contact basin ($C_L$ and $C_O$). FIG. 4(c) shows the instantaneous residence time of fluid in the reactor, where FIG. 4(b) shows weir height versus time. The flow rate is shown in FIG. 4(a) and represents the variable inlet flow rate which is identical to the flow rate shown in FIG. 2(a).

The feedforward controller used in the simulation study was implemented using $\tau_{res}^o$=3600 s. Also, $w_w$ was fixed at 8.0 m. Dynamics are not modeled for the dynamic weir, as it is assumed that a change in weir height would be realized much faster than the time scale of the basin; hence the relationship $h_w(t)=h_w^o(t)$ is adopted as previously discussed.

Figure 2:
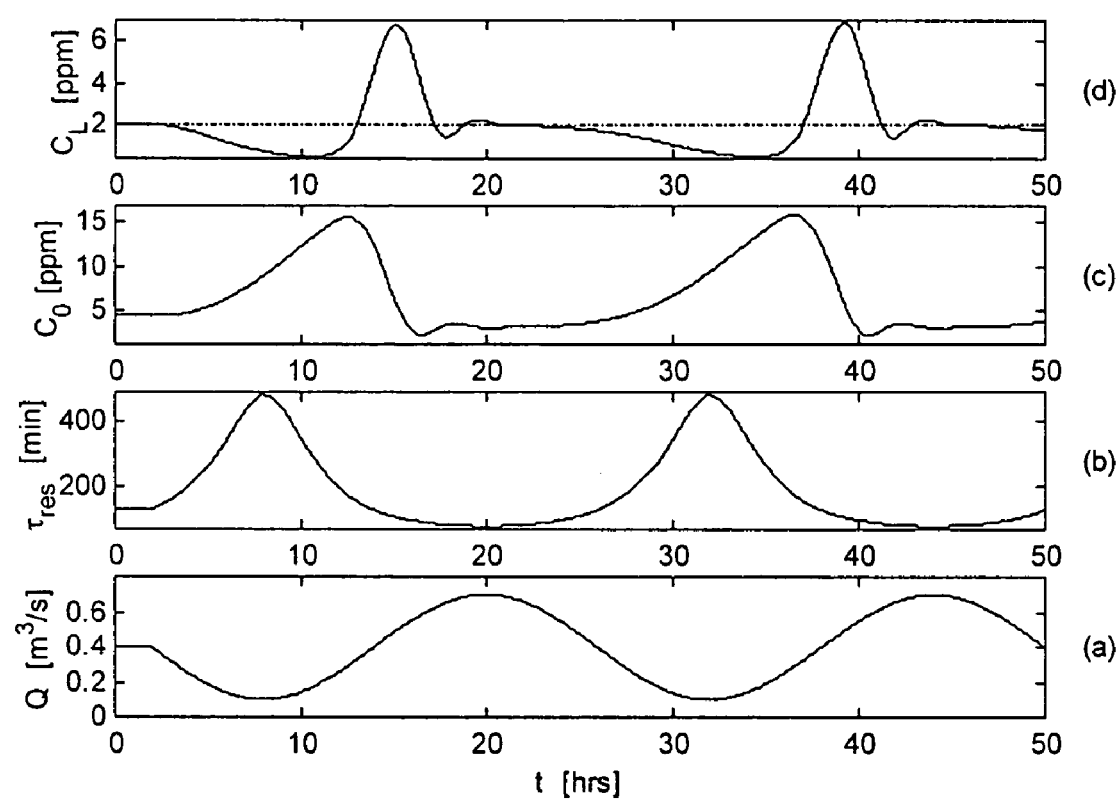
FIG. 2(a)–(d) shows simulated performance aspects of the system shown in FIG. 1 when the inlet flow rate is highly variable illustrating poor control performance when large changes in residence time occur.

Comparing the results based on system 300 according to the invention and reported in FIGS. 4(a)–(e) with the results obtained from the conventional system 100 reported in FIGS. 2(a)–(d), it can be seen that the value of the outlet concentration $C_L$ is controlled substantially better by system 300. For system 300, $C_L$ is in the approximate range of 1.99 ppm<$C_L$(t)<2.01 ppm as shown by FIG. 4(e), as compared to the significantly wider range of 0.5 ppm<$C_L$(t)<6.9 ppm for system 100 as shown in FIG. 2(d). Thus, FIGS. 4(a)–(e) demonstrate that systems according to the invention including a dynamic weir can virtually eliminate flow rate induced fluctuations on the outlet chlorine concentration. Although described above in terms of a dynamic weir, as noted before, the output flow rate of the system can also be dynamically adjusted using an alternate flow obstacle, such as a sluice gate, or a pump.

It is to be understood that while the invention has been described in conjunction with the preferred specific embodiments thereof, that the foregoing description as well as the examples which follow it are intended to illustrate and not limit the scope of the invention. Other aspects, advantages and modifications within the scope of the invention will be apparent to those with ordinary skill in the art to which the invention pertains.

The invention claimed is:

1. An automated reactor-based system for treating water, comprising:
    a reactor including an inlet to provide water at an inlet flow rate into said reactor;
    structure for adding at least one treatment chemical to said water;
    structure for dynamically adjusting an output flow rate of said water from said reactor, and
    a controller communicably connected to said structure for adjusting output flow rate to dynamically control residence time of said water in said reactor to a predetermined residence time, said controller receiving at least one input including said inlet flow rate and generating an output flow rate value to achieve said predetermined residence time, said output flow rate value communicated to and implemented by said structure for dynamically adjusting an output flow rate.

2. The system of claim 1, wherein said structure for dynamically adjusting an output flow rate comprises a flow obstacle.

3. The system of claim 2, wherein said flow obstacle is a weir.

4. The system of claim 3, wherein said weir provides a dynamically adjustable height.

5. The system of claim 3, wherein said weir provides a dynamically adjustable gap.

6. The system of claim 5, wherein said dynamically adjustable gap comprises an obstruction including a vertical gap.

7. The system of claim 1, wherein said structure for dynamically adjusting an output flow rate comprises a pump.

8. The system of claim 1, wherein said controller is a feed forward controller.

9. The system of claim 1, wherein said controller is a proportional-integral-derivative (PID) controller.

10. The system of claim 1, wherein said controller is a digital controller.

11. The system of claim 1, wherein said controller is an analog controller.

12. The system of claim 1, wherein said controller is selected from the group consisting of a lead-lag controller, a predictive controller and a adaptive controller.

13. The system of claim 1, wherein a substantially constant residence time of said water in said reactor is provided by said system.

14. The system of claim 1, wherein said system is a wastewater treatment system.

15. An automated method for treating water in an open-flow channel, comprising the steps of:
  determining an inlet flow rate of water into an open-flow channel;
  adding at least one treatment chemical to said water, and automatically and dynamically adjusting an output flow rate from said open-fluid channel based on at least one parameter including said inlet flow rate to achieve a predetermined residence time of said water in said open-flow channel.

16. The method of claim 15, wherein a substantially constant residence time of said water in said flow-channel is provided.

17. The method of claim 15, wherein said open-flow channel is included in a wastewater treatment system.

18. The method of claim 15, wherein said treatment chemical comprises chlorine.

19. The method of claim 15, wherein said automatically and dynamically adjusting an output flow rate step comprises dynamically adjusting a height of a flow obstacle or a gap of a flow obstacle.

20. The method of claim 15, wherein said automatically and dynamically adjusting an output flow rate step comprises dynamically adjusting a height of a weir.

21. The method of claim 15, wherein said automatically and dynamically adjusting an output flow rate step comprises dynamically adjusting a pumping rate of a pump.

* * * * *